UNITED STATES PATENT OFFICE.

JASON H. GREENSTREET, OF INDIANAPOLIS, INDIANA.

CURING MEATS.

SPECIFICATION forming part of Letters Patent No. 439,144, dated October 28, 1890.

Application filed February 24, 1890. Serial No. 341,565. (No specimens.)

*To all whom it may concern:*

Be it known that I, JASON H. GREENSTREET, a citizen of the United States, residing at Indianapolis, in the county of Marion and State of Indiana, have invented certain new and useful Improvements in the Process of Curing Meats, of which the following is a specification.

In the process of curing meats as ordinarily conducted in pork-houses and other slaughtering-establishments a considerable amount of time is consumed, commonly from fifty to ninety days. Obviously it is of great importance to reduce this time, as, in large establishments especially, the capital employed, which is necessarily very large, could thus be reduced or the amount of business increased proportionally, and interest charges thus reduced or earnings increased. Other expenses of carrying stock—such as insurance, storage, &c.—will also be reduced by any shortening of the time. Loss from souring or tainting of meats will also be diminished if a shortening of time can be effected.

The object of my said invention therefore is to so treat meats of various kinds that the curing can be accomplished in a shorter time than heretofore. I propose to do this by making a solution of soda, carbonate of sodium, or bicarbonate of sodium, by adding the same to water in the proportion of about one pound to ten gallons of water, although of course this proportion may be varied, and then either immerse or sprinkle the meats in such solution for a necessary period of time—usually from about six to twenty-four hours—according to the nature and size of the meats. The purpose of this application is to destroy certain molecules in the meat, which are the source of the souring and tainting, and to render the meat pervious, so that the salt or sweet pickle with which the curing is accomplished may more quickly and thoroughly penetrate it, which of course accomplishes the object of my invention. The meat is taken fresh from slaughtering and subjected to this solution. Fowl and fish may of course be treated in this manner as well as meats. I estimate the saving in time by the adoption of my process at from twenty-five to sixty per cent., according to the size and character of the meats to be treated.

Heretofore carbonate of sodium has been used in curing meats by adding it to a pickle made of salt, saltpeter, sirup, &c., in which the meats were placed. Under this method the salt had the effect to close up the pores of the meats to a degree, causing a slow cure, requiring fifty to ninety days (according to the size of the meats) to cure sufficiently to undergo the application of smoke without tainting. By applying the solution of carbonate of sodium before salt is applied the pores of the meats are opened, rendering the meats more susceptible to a quick penetration by the salt, and thus enabling them to at once receive the beneficial effect of saltpeter, salt, &c., thereby materially reducing the time heretofore required.

Having thus fully described my said invention, what I claim as new, and desire to secure by Letters Patent, is—

That process of curing meats which consists in first taking the meats fresh from slaughtering and subjecting them to a solution of soda and afterward subjecting them to the action of salt or sweet pickle in the ordinary and well-known manner, substantially as described, and for the purpose as specified.

In witness whereof I have hereunto set my hand and seal, at Indianapolis, Indiana, this 20th day of February, A. D. 1890.

JASON H. GREENSTREET. [L. S.]

Witnesses:
CHESTER BRADFORD,
JAMES A. WALSH.